United States Patent [19]

Nulman et al.

[11] Patent Number: 4,919,542
[45] Date of Patent: Apr. 24, 1990

[54] EMISSIVITY CORRECTION APPARATUS AND METHOD

[75] Inventors: Jaim Nulman, Palo Alto; Nick J. Bacile, San Jose; Wendell T. Blonigan, Sunnyvale, all of Calif.

[73] Assignee: AG Processing Technologies, Inc., Sunnyvale, Calif.

[21] Appl. No.: 186,558

[22] Filed: Apr. 27, 1988

[51] Int. Cl.$^5$ .................... G01J 5/10; G01N 25/00
[52] U.S. Cl. ............................ 374/9; 374/126; 374/128; 374/133; 356/43; 350/438; 350/439; 250/338.3; 250/339
[58] Field of Search ............... 374/120, 121, 126, 127, 374/128, 129, 130, 133, 9; 356/43, 45; 350/243, 438, 439; 250/338.3, 339

[56] References Cited

U.S. PATENT DOCUMENTS

| | | | |
|---|---|---|---|
| 3,433,052 | 3/1969 | Maley | 374/129 |
| 3,439,985 | 4/1969 | Comstock, Jr. et al. | 356/43 |
| 3,539,807 | 11/1970 | Bickel | 374/129 |
| 3,611,806 | 10/1971 | Hishikari | 374/127 |
| 3,796,099 | 3/1974 | Shimotsuma et al. | 374/126 |
| 4,564,761 | 1/1986 | Buckwald et al. | 250/341 |
| 4,647,774 | 3/1987 | Brisk et al. | 374/128 |
| 4,708,493 | 11/1987 | Stein | 374/126 |

FOREIGN PATENT DOCUMENTS

| | | | |
|---|---|---|---|
| 57-160029 | 10/1982 | Japan | 374/129 |
| 58-131523 | 8/1983 | Japan | 374/126 |
| 58-171643 | 10/1983 | Japan | 374/126 |
| 60-44838 | 3/1985 | Japan | 356/43 |
| 60-131430 | 7/1985 | Japan | 374/121 |
| 61-130834 | 6/1986 | Japan | 374/133 |
| 62-50627 | 3/1987 | Japan | 374/121 |
| 744914 | 2/1956 | United Kingdom | 374/130 |

OTHER PUBLICATIONS

Gardner, J. L. and Jones, T. P., "Multi-Wavelength Radiation Pyrometry Where Reflectance is Measured to Estimate Emissivity", J. Phys. E. Sci. Instrum., vol. 13, No. 3, pp. 306–310, Mar. 1980.

Johansson, Rutger, "A New Real-Time Infrared Imaging and Measuring System for Burden Top Temperature Monitoring on Blast Furnaces", ISA Transactions, vol. 17, No. 4, pp. 47–53, (1978).

"Industrial Use of Radiation Pyrometers under Non--Blackbody Conditions", Harrison, Thomas R., Journal of the Optical Society of America, vol. 35, No. 11, pp. 708–723, Nov. 1945.

Primary Examiner—William A. Cuchlinski, Jr.
Assistant Examiner—Diego F. F. Gutierrez
Attorney, Agent, or Firm—A. C. Smith

[57] ABSTRACT

Radiation detectors and method measure the emissivity of a remote, heated semiconductor wafer in the presence of ambient radiation. Incident radiation within a selected waveband from a controlled source intermittently radiates the remote wafer, and reflected radiation therefrom is detected in synchronism with the intermittent incident radiation to yield output indications of emissivity of the wafer under varying processing conditions. The temperature of the wafer is monitored by another radiation detector (or detectors) operating substantially within the same selected waveband, and the temperature indications thus derived are corrected in response to the output indications of emissivity to provide indications of the true temperature of the wafer.

6 Claims, 3 Drawing Sheets

EMISSIVITY CORRECTION APPARATUS AND METHOD

RELATED APPLICATIONS

The subject matter of this application may relate to the subject matter disclosed in pending patent application Ser. No. 114,542, entitled "Emissivity Calibration Apparatus and Method", filed on Oct. 26, 1987, by Michel Pecot and Jaim Nulman, and in pending Patent application Ser. No. 186,556, entitled Pyrometer Apparatus and Method, filed on Apr. 27, 1988, by Thomas E. Thompson.

BACKGROUND OF INVENTION

Accurately measuring the elevated temperature of a remote object in a very hot environment, such as a furnace, using optical techniques and without touching the object is complicated by reflections of the environment's ambient radiation along with radiation from the heated object itself. Radiation thermometry is a technique which allows the measurement of the temperature of a remote object by analyzing the radiation emitted by the object. All objects at temperatures greater than 0 kelvin emit radiation which can be measured to determine the temperature of the object, provided the emissivity of the object is known. The concept of radiation thermometry is based upon the underlying principle that as the temperature of an object increases, the radiation it emits shifts in wavelength and increases in intensity so that an object which emits radiation with an orange glow is hotter than an otherwise identical object which emits radiation with a red glow. Details of radiation thermometry are discussed in the literature (See, for example, Tenney; *Mechanical Engineering*, Oct. '86; "Red Hot ... AND HOTTER", pp. 36–41.)

SUMMARY OF INVENTION

In accordance with the present invention, the method and means for measuring temperature of remote heated objects such as semiconductor wafers with varying emissivities in the presence of ambient radiation within a processing chamber utilizes optical pyrometery techniques. More specifically, the present invention accurately determines the temperature of a semiconductor wafer including diverse surface coatings within a surrounding environment which includes ambient radiation predominantly from local heating sources. In accordance with the illustrated embodiment of the present invention, a pyrometer detector measures radiation from the wafer within the hot environment of a processing chamber. To compute the true temperature of the wafer, radiation from an externally controlled source is intermittently supplied to the wafer, and such radiation as is reflected from the wafer to a detector is synchronously detected to monitor the emissivity of the wafer. This enables the signals produced by the detector to be processed to yield an output representative of the emissivity of the wafer. The output can then be utilized to correct optical measurements of temperature of the wafer for varying emissivities of the wafer over a selected range of processing temperatures and surface coatings.

BRIEF DESCRIPTION OF THE DRAWINGS

FIG. 3 is a plan view of the rotating radiation shutter or chopper.

DESCRIPTION OF PREFERRED EMBODIMENT

Figure 1:
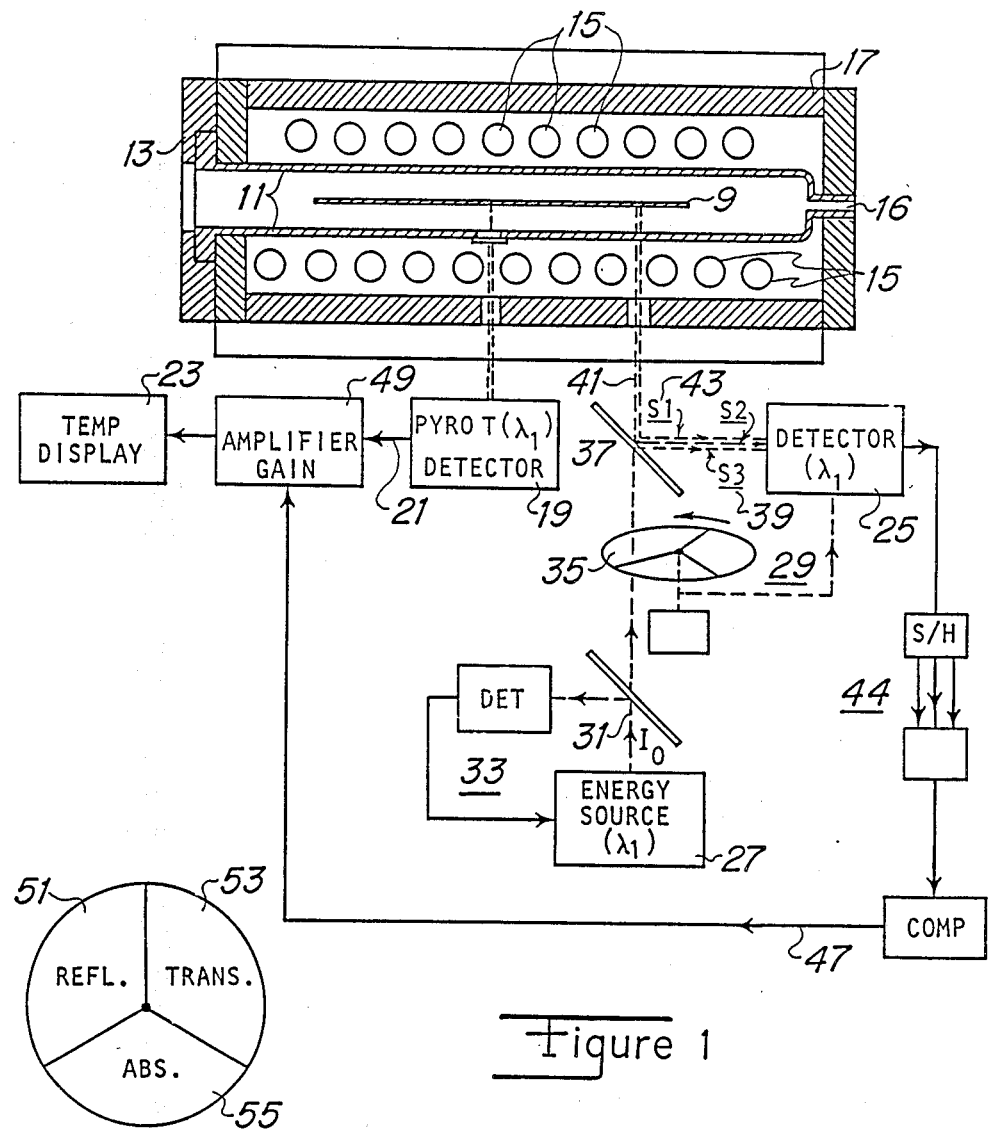
FIG. 1 is a pictorial view of one embodiment of the present invention.

Referring now to the pictorial diagram of FIG. 1, there is shown a semiconductor wafer 9 disposed within an enclosing processing chamber 11 that includes a sealable access hatch 13 and a port 16 for introducing inert or reactive gases into the chamber 11. The wafer 9 within the chamber 11 is heated through the walls of chamber 11 via tungsten-filament light sources 15, and the walls of the chamber 11 are preferably formed of quartz. The surrounding housing 17 may be gold plated to reflect radiation from the filaments 15 onto the wafer 9 within the chamber 11.

Temperature of the wafer 9 may be remotely monitored by a an optical pyrometer 19 that is positioned outside the housing 17 to measure radiation from the wafer 9 that is received through the quartz walls of the chamber 11, between filaments 15, at one or more wavelengths. Pyrometers of this type are described in the aforecited Related Application Ser. No. 186,556.

Such temperature measurement of the wafer 9 may be inaccurate because of varying emissivity of the wafer 9 with such factors as temperature, material, surface coatings and thicknesses, and the like. Therefore, the temperature-representative output 21 from the pyrometer 19 should be corrected for emissivity of the wafer 9 in order to provide an accurate indication 23 of the temperature of the wafer 9 within the chamber 11.

In accordance with the present invention, an optical detector 25 is positioned outside the housing 17 to receive radiation that is supplied to and reflected from the wafer via an external source 27 and optical system 29. Specifically, the source 27 supplies radiation 31 at a wavelength substantially equal to the wavelength at which the pyrometer 19 measures radiation from the wafer 9. The output intensity of this radiation source 31 may be controlled via a closed-loop control system 33 which detects a sample of the output radiation 31 and maintains its intensity at a substantially constant incident intensity, Io. Radiation from the controlled source 27 is alternately interrupted and transmitted, via rotating shutter or chopper 35, toward beam splitter 37. There, a portion ($S_3$) of the radiation is sensed by detector 25 to provide a time-shared output indication of the reference level of radiation, and a portion 41 is transmitted through the walls of chamber 11 between filaments 15 toward the wafer 9 within the chamber 11. For quartz walls of chamber 11, if the wavelength of the incident radiation portion 41 is greater than about 3.5 microns, then it is desirable to transmit the incident radiation 41 through a section of chamber wall 11 of substantially reduced thickness (or through a wall section having a transmissive "window" of such material as sapphire) to minimize the effects of the poor transmission properties of quartz at longer wavelengths.

The radiation that is intermittently supplied to the wafer 9 from the source 27 via optical system 29 is partially reflected ($S_2$) from the wafer 9 toward the detector 25 which is activated in synchronism with the optical shutter 35 to provide a time-shared output indication of the level of reflected radiation at the selector wavelength. In addition, the detector 25 also detects the radiation ($S_1$) 43 that emanates from the walls of the chamber 11 and produces an output representative of the background or ambient radiation from the chamber 11.

The time-shared outputs attributable to the ambient radiation, and to the optically-chopped incident radiation and reflected radiation from controlled source 27 may be processed in circuit 44 in conventional manner using sample-and-hold circuits or digitizers and accumulators, or the like, to provide the representative outputs that can be processed in conventional manner to yield a signal 47 representative of the difference between the intensity of the incident radiation to the wafer and the reflected radiation from the wafer. This signal is representative of the emissivity of the wafer 9 on the basis of the relationship:

$$E + R + T = 1 \quad \text{(Eq. 1)}$$

where E = emissivity; R = reflectivity; and T = transmissivity. Thus, for silicon wafers 9 which have high transmissivity at room temperature for radiation in the waveband around the selected wavelength, and which have low transmissivity in the same waveband at elevated temperatures, the emissivity of the wafer will change with temperature substantially in inverse relationship to transmissivity. Since the reflectivity of the silicon wafer 9 does not change significantly with temperature, the output signal 47 may therefore be applied to control the gain of an amplifier 49 that amplifies the signal 21 representative of the wafer temperature sensed by the pyrometer 19. The relationships between the true temperature of the wafer 9 and its emissivity, and the temperature reading displayed on device 23 may be calibrated over a range of processing temperatures of the wafer 9 by detecting the actual temperature of the wafer 9, for example, by using contact thermometry, and correlating the displayed temperature readings on device 23 with the actual temperatures by establishing gain settings in amplifier 49 under control of the signal 47 that is representative of the emissivity of the wafer 9. Thereafter, the temperatures of all similar wafers 9 processed within the chamber 11 can be optically detected and accurately displayed on device 23 with appropriate corrections included for changes in emissivity with temperature.

Figure 2:
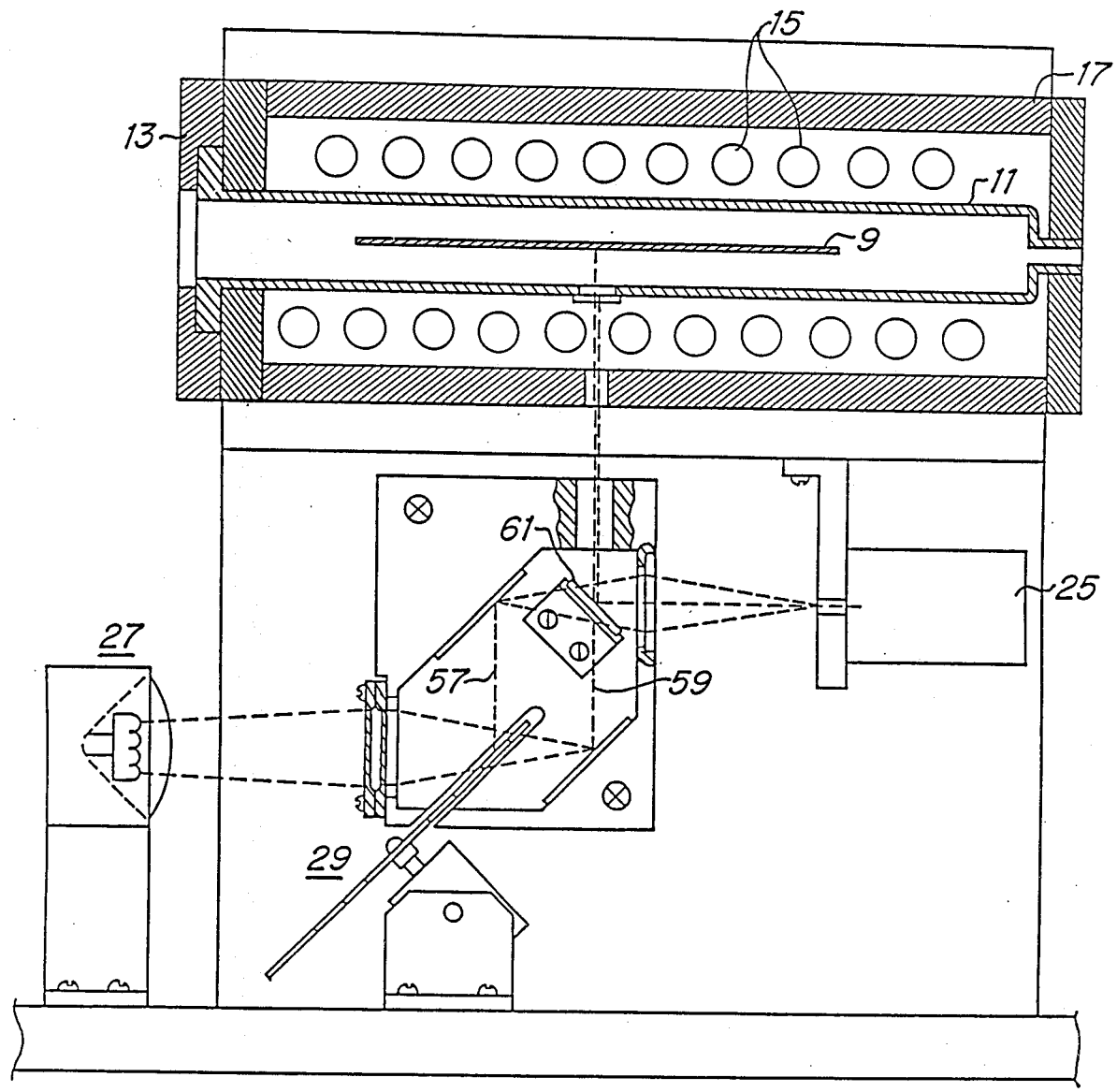
FIG. 2 is a pictorial view of one implementation of the embodiment illustrated in FIG. 1.

Referring now to FIG. 2, there is shown a pictorial diagram of the embodiment illustrated in FIG. 1. The optical shutter or chopper 29 is disposed between the radiation source 27 and the wafer 9 within chamber 11 to intermittently and cyclically interrupt and reflect and absorb radiation within the optical path. Specifically, with reference to FIG. 3, there is shown a plan view of the rotating chopper, including the three sections 51, 53, 55, respectively, of radiation reflective, transmissive and absorptive characteristics. In operation, radiation from the source 27 is reflected 57 from the section 51 toward the detector 25, or is transmitted 59 through the section 53 toward the wafer 9, or is absorbed by the section 55. In this manner, the incident intensity from the source 27 may first be measured (and used in a control loop 33 to maintain the intensity of the source substantially constant). Then, with rotation of the chopper, the radiation from source 27 is transmitted through section 53 to the beam splitter 61 and to the wafer 9, from which it is reflected to the beam splitter 61 and then to the detector 25. With further rotation of the chopper, radiation from source 27 is absorbed in the section 55, and radiation originating from the wafer and/or chamber is transmitted via the beam splitter 61 to the detector 25. Thus, three separate radiation signals are sensed by the detector 25 and detection of these signals in synchronism with rotation of the chopper 29 and using conventional sample and hold circuitry produces three distinct output signals representative, respectively, of the incident intensity of radiation ($S_3$ related to 41) from source 27, the intensity of the radiation from the source 27 that is reflected ($S_2$) from the wafer 9, and the intensity of ambient radiation ($S_4$) from the chamber 11. These three signals may thus be processed in the manner previously described to provide the output signal 47 representative of the emissivity of the wafer 9.

Figure 4:
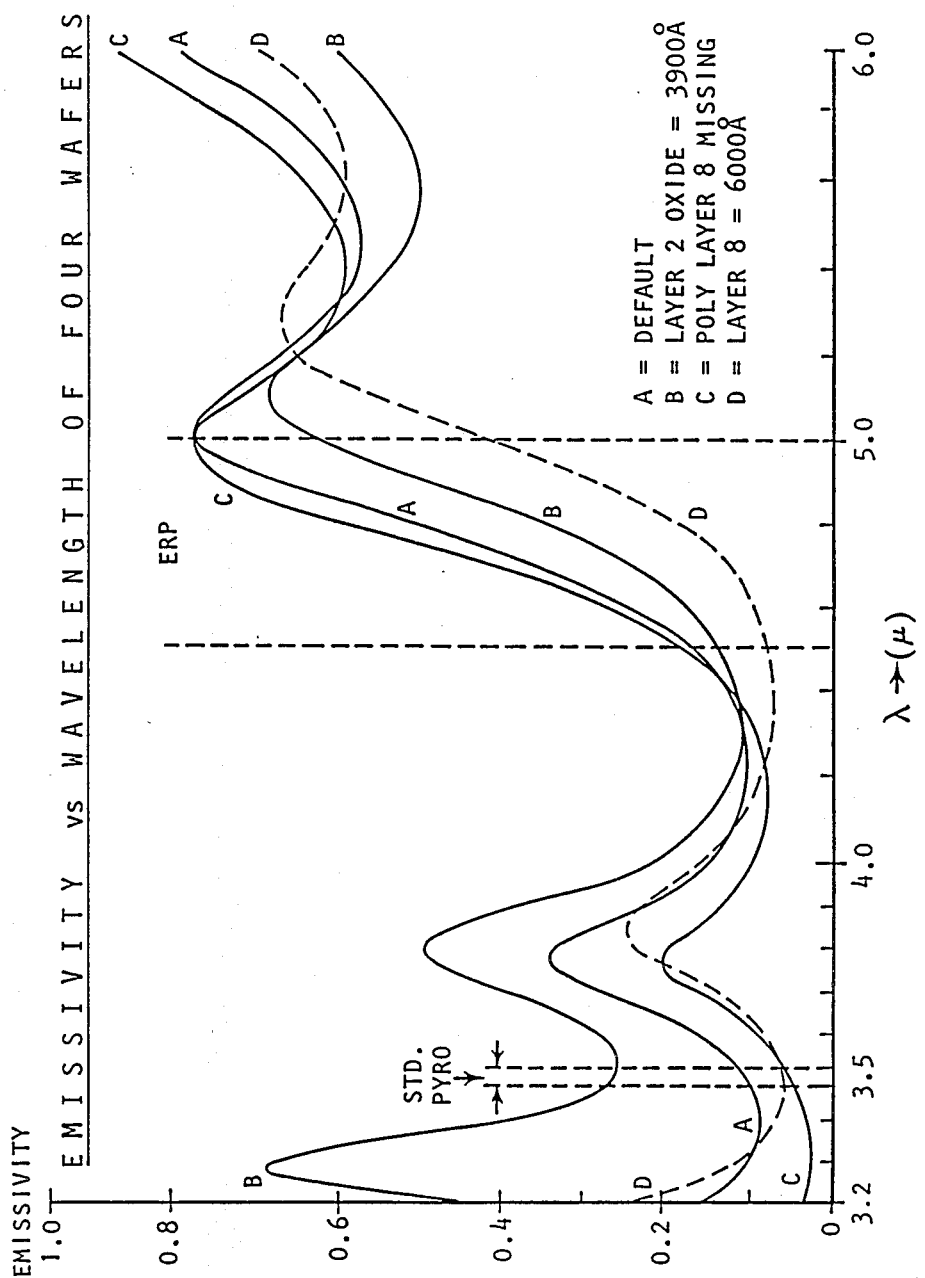
FIG. 4 is a graph illustrating representative emissivity characteristics with wavelength for a semiconductor wafer having various surface characteristics.

Referring now to the graph of FIG. 4, there is shown a family of curves of typical emissivity as a function of wavelength of a silicon semiconductor wafer operating at a selected temperature of approximately 600° C. with diverse surface and coating characteristics. It should be noted from these curves that emissivity of a semiconductor wafer changes significantly with coatings or layers of polysilicon or oxides or nitrides of silicon. It should also be noted that pyrometry detection of the wafer temperature operating on radiation within a standard pyrometer waveband about 3.5 microns is substantially affected by changes in emissivity within such waveband as a function of the surface characteristics.

Therefore, the emissivity detection apparatus and method of the present invention yields signal information indicative of the emissivity within a selected waveband of a remote semiconductor wafer at an elevated temperature within a processing chamber, and such signal information is then useful for correcting a pyrometrically-determined temperature reading taken remotely of the wafer using radiation within the selected waveband.

What is claimed is:

1. A method for measuring the emissivity of a remote object within a chamber including a boundary wall of quartz in the presence of ambient radiation supplied thereto through the quartz boundary wall, the method comprising the steps of:

detecting through the quartz boundary wall the radiation within a selected waveband from a selected location on the remote object that is heated to elevated temperature by the radiation supplied thereto through the quartz boundary wall;

supplying radiation within the selected waveband through the quartz boundary wall to the selected location on the object;

measuring the radiation reflected through the quartz boundary wall from the selected location on the object of the supplied radiation; and logically combining indications of the detected radiation and the measured reflected radiation to provide an output indication of the emissivity of the remote object.

2. The method according to claim 1 wherein in the steps of detecting and measuring, the selected waveband is between approximately 4.5 microns and 6 microns.

3. The method according to claim 1 wherein in the step of supplying radiation, infrared radiation in the selected waveband between approximately 4.5 microns and 6 microns is intermittently supplied to the object, and in the step of measuring, the reflected radiation is detected in synchronism with the intermittent supply of radiation to the remote object.

4. The method of claim 1 wherein said step of logically combining includes selectively adjusting the detected value of radiation from the selected location on the object in accordance with changes in the measurement of radiation reflected from the object.

5. Apparatus for measuring the emissivity of a remote object that is within a chamber including a boundary wall of quartz and that is heated to elevated temperatures by radiation supplied thereto through the quartz boundary wall, the apparatus comprising:

first detection means disposed to detect through the quartz boundary wall the spectral radiation emanating from a selected location on the remote object at elevated temperature for generating output signals representative of the detected radiation within a selected waveband;

source means of radiation disposed to supply radiation of selected intensity within the selected waveband through the quartz boundary wall to the selected location on the object;

second detection means disposed for measuring the intensity of the radiation from the source means reflected from the selected location on the object; and circuit means coupled to receive the output signals from said first and second detection means for producing therefrom an output that is representative of the emissivity at elevated temperature of the remote object.

6. Apparatus as in claim 5 comprising:

filter means disposed within the fields of view of the first and second detector means for transmitting therethrough substantially only radiation within the waveband from approximately 4.5 microns to approximately 6 microns.

* * * * *